Sept. 17, 1946.  E. GREETHAM  2,407,878
MEANS FOR CARRYING OUT THE HEAT TREATMENT OF GLASS ARTICLES
Filed Oct. 17, 1944

Inventor:
ERNEST GREETHAM
By Richards & Geier
Attorneys

Patented Sept. 17, 1946

2,407,878

UNITED STATES PATENT OFFICE 2,407,878

MEANS FOR CARRYING OUT THE HEAT-TREATMENT OF GLASS ARTICLES

Ernest Greetham, London, England

Application October 17, 1944, Serial No. 559,102
In Great Britain December 11, 1942

6 Claims. (Cl. 49—58)

This invention relates to improvements in or relating to a means for carrying out the heat treatment of glass articles.

In various glass working operations it is necessary to heat a glass article to progressively or gradually increasing temperatures and to apply heat as uniformly as possible around the periphery of the part being treated. Thus for instance in processes such as the sealing of electric lamps, radio valves, vacuum flasks and the like it is necessary for certain parts to be gradually or progressively heated uniformly around the circumference to a temperature at which the glass becomes sufficiently softened for the sealing to be effected. In carrying out such sealing operations with the aid of apparatus at present commonly used the parts to be sealed are held in supports mounted upon or constituting the principal part of a number of heads mounted at equidistant points near the edge of a circular table, the heads being rotated around their own axes so as to expose the parts to be heated to the flames of burners located around the table and mounted on fixed parts of the machine and the table being intermittently rotated about its own axes so as to move the articles from station to station, the heating in successive stations being increased in stages and the heating in the final stage being sufficient to raise the temperature of the glass to the temperature at which sealing can be completed.

This known method has certain disadvantages and limitations amongst which may be mentioned the loss of time and temperature in transferring the articles from station to station and the constructional difficulties involved in designing rotary supporting heads for handling large articles.

One of the objects of the present invention is to provide simple and efficient apparatus whereby these disadvantages and limitations may be overcome.

According to the present invention there is provided an apparatus for subjecting glass articles to heat treatment wherein the desired part of the article is heated by means of a plurality of flames disposed around its periphery and the size and intensity of such flames are automatically increased in a predetermined cycle so as to raise the temperature in desired stages up to the desired final temperature.

According to a further feature of the present invention there is provided apparatus comprising a burner of annular or substantially annular form having a plurality of inwardly directed jets and automatically operated valve mechanism for causing the supply of gas to said jets to vary in a predetermined manner. The term "gas" as used as herein is intended to cover any suitable gas or mixture of gases e. g. coal gas and air or coal gas and oxygen.

In carrying out the present invention there may be provision for heating a single article or a plurality of articles. In the former case the burner may be controlled by a valve, for instance a rotary valve, driven by any suitable mechanism enabling the supply of gas and consequently the heating effect to be varied in the desired predetermined manner. Thus for instance the valve may be driven by any suitable means, such as for instance by means of an electric motor. Thus for instance the machine may include a rotary table and the speed of rotation and the other factors determining the degree to which the article is heated may be so correlated that the heat treatment is completed during the time taken for the machine to make one revolution. An operator may therefore load the various supports as they come into a single loading zone and moreover he can remove the treated articles as they come into such zone, the operation of the machine thereby being continuous.

Thus for instance in the above case where the apparatus includes a rotary table carrying a plurality of burners and supports around its periphery rotation of such table may automatically control the movement, e. g. rotation, of a gas valve or distributor controlling the heating cycle.

The valve mechanism employed in apparatus according to the present invention is preferably adapted to establish communication between the burner or each burner and sources of gas at progressively increasing pressures as opposed to varying the size of the supply conduit for the purpose of progressively increasing the heating effect at the said burner or burners. Thus for instance there may be supply from sources at three different pressures and the burners may be fed with gas from each of said sources in succession, the periods during which each supply is in operation being equal to one another or varying as may be desired. In general the composition of the gas mixture as well as the pressure supplied from each source to the burners will vary according to the heating cycle required.

In cases where there is provision for supplying the burner or burners from several different sources it will be desirable to adopt precautions for the purpose of avoiding or minimising any flow of gas from a source at one pressure to a source at a lower pressure at the point or points where a change over from one pressure to another is made. Thus for instance I may so arrange the valve mechanism that cut-off of one supply takes place before the next supply is opened and in such cases I may provide any suitable transfer ports, buffer ports or the like for the purpose of ensuring that a certain amount of gas will be supplied to the burner or burners during the change over, so keeping said burner or burners alight and avoiding any interruption in the application of heat to the article or articles being treated.

The means for gripping and supporting the articles to be treated may be of any suitable kind and may be fixed.

In order that the present invention may be well understood I will now describe, by way of example only, one embodiment thereof with reference to the accompanying drawing in which.

Figure 1:
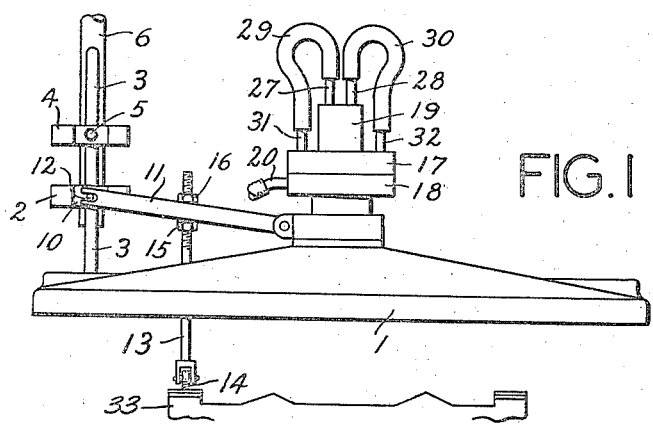
Figure 1 is a front elevation of a part of the machine.

Referring to the figures, the machine includes a table 1 which is mounted for rotation about a vertical axis and is driven by means of a motor of any suitable kind, the mounting and driving means being omitted from the drawing in the interests of clarity.

A plurality of work-supporting means, hereinafter called "heads," and a corresponding number of burners are located around the periphery of the table 1, there being for instance twelve heads and twelve burners disposed symmetrically therearound. In Figure 1 of the drawing for the sake of clarity only one of the burners and one of the heads are shown, the burner being designated 2 and the head including a pair of vertical rods, only one of which, designated 3, appears in Figure 1 as the second one is located immediately therebehind. One or more holders or cradles for gripping the work extend between the rods 3 and these may be of any desired kind. In Figure 1 only a single holder is shown and designated 4, such holder being for instance of the iris diaphragm type and being vertically adjustable along the rods 3. Set screws, one of which is shown in Figure 1 and designated 5, or any other suitable means may be provided for locking said holder at the desired distance from the table 1.

If desired a second work support may be provided between the rods 3 for the purpose of holding the lower part of a tube 6 or the stem of an electric lamp or the like in a known manner.

Figure 2:
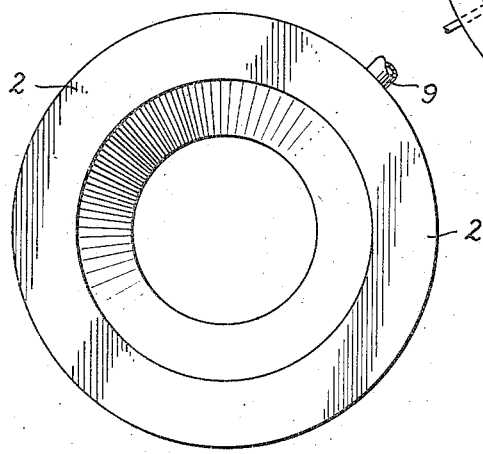
Figure 2 is a plan view of one form of burner.
Figure 3:
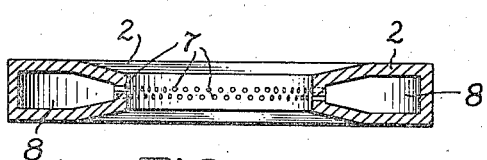
Figure 3 is a sectional elevation of the burner shown in Figure 2.

The burner 2, which is shown in greater detail in Figures 2 and 3, is of annular form and has fine apertures 7 closely spaced around its inner wall. Such apertures may be arranged in one or more rows although as shown in the figure it is usually preferable to provide two rows of apertures with the apertures in the respective rows slightly inclined towards one another. The internal diameter of the said burner preferably exceeds the diameter of the work to be treated by only a small distance e. g. about 1 inch, the distance of separation of the jets from the work being thus considerably less than in the usual form of glass heating apparatus.

The burner illustrated is of a type intended for oxy-coal gas mixtures for use on hard glass but burners of similar form can be used on air gas mixtures.

The aforesaid burner 2 may of course include any desired number of jets and the size of such jets may vary but it is desirable that the number and size of such jets be so chosen that at the relatively close working distance uniform or substantially uniform heating of the work is secured without any necessity for relative rotation between the work and the burner. I find for instance that satisfactory results can be achieved on 50 mm. hard glass tubing by the use of an oxy-coal gas burner of seventy millimetres internal diameter having two rows of jets, each row consisting of one hundred and twenty equi-spaced jets of approximately half a millimetre in diameter.

The annular chamber 8 of the burner 2 is supplied with gas through an inlet pipe 9, the mode of supplying gas to such inlet being hereinafter described.

The aforesaid burner 2 is mounted between two collars 10 (only one of which appears in Figure 1) and said collars are slidable along the rods 3. In many operations it is desirable to cause such burner to move or oscillate in a vertical direction during the heat treatment. Such movement may if desired be achieved automatically for instance by the mechanism shown in Figure 1 which mechanism comprises an arm 11 suitably forked at each end pivotally connected at its inner end to the rotary table 1 and engaging trunnion-like extensions 12 of the collars 10 at the other end, the said arm 11 being caused to oscillate during rotation of the table 1 for instance by means of a rod 13 carrying a roller 14 which runs over a cam track 33 of a contour corresponding to the vertical movements to be generated. The position of the aforesaid rod 13 with respect to the arms 11 is preferably vertically adjustable for instance by the provision of a screw-threaded connection including adjusting nuts 15 and 16 so enabling adjustments to be made in the height of the zone through which the burner is caused to oscillate.

Gas is supplied to the nozzle 9 of the burner 2 through a control valve comprising a disc-like part 17 which is fixed with respect to the pedestal or base on which the table 1 is mounted and a disc-like part 18 which is fixed to the said table 1 so that it rotates therewith, the part 17 being for instance secured to a hollow spindle 19 extending upwardly from the base of the machine.

Figure 4:
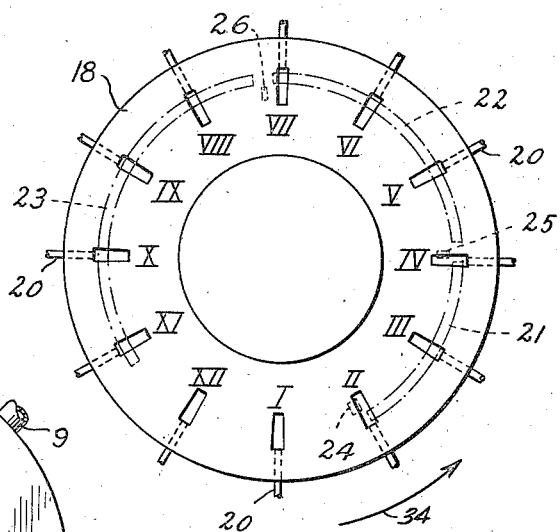
Figure 4 is a diagrammatic view showing the disposition of the ports in the rotary type of gas distributing valve.

The aforesaid parts 17 and 18 of the control valve have ground faces presented towards one another and ports are formed in said faces. One suitable disposition of the ports is shown in Figure 4 which represents a plan view of the part 18 of the valve with the ports in the part 17 superimposed thereon in chain lines to illustrate the relative positions of the two sets of ports for one position of the valve.

The part 18 of the valve is of disc-like form and is provided with a number of ports corresponding to the number of heads in the machine i. e. in the example now being described there are twelve ports, such ports being designated by Roman numerals I to XII. Each of these ports has an outlet 20, through which gas is supplied to its associated burner, for instance by means of flexible tubing.

The part 17 of the control valve is also of disc-like form with ports designated 21, 22, 23 formed in the face of said plate.

The ports 21, 22 and 23 and the ports I to XII are so located that as the part 18 of the valve is rotated the said ports I to XII sweep over the ports 21, 22 and 23. The port 22 which in the arrangement shown is about 50% longer than the port 21 is spaced from the latter port by a distance slightly greater than the width of the aforesaid ports I to XII in the part 18 of the valve and the port 23 is about 50% longer than the port 22 and similarly spaced from that port. The adjacent ends of the ports 23 and 21 are however spaced apart by a substantial distance e. g. by a distance subtending an angle of about 90° at the center of the valve disc.

The length of the ports I to XII in a radial direction is greater than the radial dimension of the ports 21, 22 and 23 and buffer or transfer ports 24, 25, 26 are provided in the fixed part 17 of the valve in positions which periodically register with the said ports I to XII during rotation of the valve. Said buffer or transfer ports are so arranged that just before the respective ports I to XII move into positions cutting off communication with the buffer ports 24, 25 and 26 they move into communication with the following main port i. e. the port 21, 22 or 23 as the case may be and the buffer ports 25 and 26 are further so arranged that the ports I to XII move into communication therewith just before they move out of communication with the ports 21 or 22 as the case may be. There is thus no intercommunication between the ports 21, 22 and 23 during operation of the valve but there is successive intercommunication between these ports and the adjacent buffer ports.

Gas at different pressures is fed to the respective ports 21, 22, 23, the pressure of supply to the port 21 being relatively low, the pressure of supply to the port 22 being greater and the pressure of supply to the port 23 being still greater.

The aforesaid buffer ports 24, 25 and 26 are fed with gas at pressures which are preferably somewhat lower than the pressure in the following main port.

The gas supply pipes to the aforesaid ports may pass through the hollow centre spindle or standard 19 of the machine. In the case of the valve illustrated there are six of these pipes of which two designated 27, 28 are shown in Figure 1 and these communicate with the appropriate ports by means of flexible tubes 29, 30 and the pipes 31 and 32.

As the part 18 of the valve is rotated in an anticlockwise direction as indicated by arrow 34 in Figure 4 the ports I to XII are moved successively from a position in which no gas is supplied thereto through positions in which gas is supplied thereto at increasing pressures back to a position in which the supply of gas is cut-off. Considering for instance the movement of the port I from the position shown in Figure 4, this port first comes into communication with the buffer port 24 whereupon gas at low pressure is supplied to the burner associated with the port I. This gas primes the burner and the supply line thereto and the gas issuing from the burner is ignited for instance by means of a pilot jet. Further movement of the part 18 brings the port I into communication with the main supply port 21, i. e. the port I occupies the position occupied by the port II in Figure 4 and as indicated such communication is established before communication with the buffer port 24 is quite broken so avoiding any interruption in the supply of gas to the burner concerned.

As soon as communication with the port 21 is established the burner is supplied with gas at a pressure appropriate for the first stage of the heat treatment and supply at that pressure is maintained for the time taken for the port I to sweep over the port 21. Just before the port I moves out of registration with the port 21 it moves into registration with the second buffer port 25 so causing a supply of gas to be maintained and registration with such buffer port persists until just after said port I moves into communication with the port 22. As soon as the latter communication is established the burner is fed with gas at a higher pressure and the second stage of the heat treatment is carried out, such stage persisting for the time taken for the port I to sweep over the port 22.

Just before the port I reaches the end of the port 22 it comes into registration with the third buffer port 26 and just before moving out of registration with said buffer port it moves into registration with the main port 23 so again ensuring continuity in the gas supply during the transition period and at the same time preventing any flow of gas from the port 22 into the port 23. The third and final stage of the heat treatment persists for the time taken by the port I in sweeping over the port 23 and the gas supply to the burner is cut off when the port I leaves the said port 23. During movement of the head from the position in which communication with the port 23 is broken to the position in which communication with the port 24 is established and a new cycle initiated the treated work may be removed from that head and further work for treatment may be fitted thereto. In this way the operation may be a continuous one, i. e. an operator can first load each head as it moves through the zone between the ports 23 and 24 and as the loaded heads successively return to that zone unloading and reloading operations can be carried out until all the articles concerned have been subjected to the desired heat treatment.

The above described apparatus ensures that there is no interruption in the heating of the articles to be treated from the time when that treatment is initiated up to the time when it is completed so offering a great advantage over the usual form of machine employed for instance for sealing lamp bulbs. Moreover the present machine offers considerable advantages over known machines involving the use of heads which rotate about their own axes owing to the reduced cost of manufacture and the wider range of articles which can be accommodated, and the greater operation speed attainable.

The above described machine can of course be loaded with any desired number of articles up to the full capacity of such machine.

Whilst I have hereinbefore described and illustrated one embodiment of the present invention I wish it to be understood that the specific details may be varied or modified without departing from the scope of such invention. Thus for example there may be provision for accommodation of any desired number of lamp bulbs or other desired glass articles, there may be any desired number of zones of treatment at different temperatures and the variations in temperature between the several zones and the particular temperatures of the respective zones may be of any desired value and means may be provided for varying the time taken in causing an article to pass through the heating cycle.

I claim:

1. In a device for heating glass articles to progressively increasing temperatures said device having a table rotatable about a stationary support and work holders and heaters arranged on said table, gas supply means for said heaters, said means comprising a valve plate secured to the stationary support, said plate having at one surface thereof a plurality of spaced apart main gas ports and auxiliary ports intermediate the spaces between the main ports, a second valve plate, said second valve plate being secured to the table and movable therewith, and in surface engagement with the first mentioned plate, the said second plate having a plurality of ports in its engaging surface, and corresponding in number to the number of work holders, the ports in the movable plate being arranged so as to be in communication with the main ports and to register with one of the auxiliary ports just prior to breaking communication with one of said main ports and to break communication with the said auxiliary port immediately after making communication with the next main port, gas inlet means connected to the stationary plate ports, and gas outlet means from the movable plate ports connected to the heaters.

2. In a device for heating glass articles to progressively increasing temperatures said device having a table rotatable about a stationary support and work holders and heaters arranged on said table, gas supply means for said heaters, said means comprising a valve plate secured to the stationary support, said plate having at one surface thereof a plurality of spaced apart main gas ports and auxiliary ports intermediate the spaces between the main ports, a second valve plate, said second valve plate being secured to the table and movable therewith, and in surface engagement with the first mentioned plate, the said second plate having a plurality of ports in its engaging surface, and corresponding in number to the number of work holders, the ports in the movable plate being arranged so as to be in communication with the main ports and to register with one of the auxiliary ports just prior to breaking communication with one of said main ports and to break communication with the said auxiliary port immediately after making communication with the next main port, gas inlet means connected to the stationary plate ports, and gas outlet means from the movable plate ports connected to the heaters, the ports in the movable plate being radially longer than the radial length of the ports in the stationary plate.

3. In a device according to claim 2, wherein the main ports are three in number and wherein the circumferential lengths of the main ports are such that the second port is substantially 50% longer than the first port and the third is substantially 50% longer than the second port.

4. In a device according to claim 2, wherein the main parts are three in number and wherein the gas supplied to the first main port is of relatively low pressure, greater in the second and still greater in the third.

5. In a device according to claim 2, wherein the gas supplied to each of the auxiliary ports is of lower pressure than the pressure in the following main port.

6. In a device according to claim 2, wherein the spacing of the main ports is such that a substantially large space is provided between the first and last of said ports for the purpose specified.

ERNEST GREETHAM.